United States Patent [19]
Bonnet et al.

[11] Patent Number: 5,390,212
[45] Date of Patent: Feb. 14, 1995

[54] INSTALLATION FOR PRODUCING MOLTEN METAL IN AN ELECTRIC FURNACE

[75] Inventors: Claude Bonnet, Andrezieux-Boutheon; Guy Forestier, Saint Just Saint Rambert; Jacques Barbe, Saint Etienne, all of France

[73] Assignee: Clecim, Cergy-Pontoise, France

[21] Appl. No.: 917,120

[22] PCT Filed: Dec. 6, 1991

[86] PCT No.: PCT/FR91/00980

§ 371 Date: Aug. 6, 1992

§ 102(e) Date: Aug. 6, 1992

[87] PCT Pub. No.: WO92/10594

PCT Pub. Date: Jun. 25, 1992

[30] Foreign Application Priority Data

Dec. 6, 1990 [FR] France ............................ 90 15320
Dec. 6, 1990 [FR] France ............................ 90 15321
Dec. 12, 1990 [FR] France ............................ 90 15595

[51] Int. Cl.[6] ............................................. F27D 3/00
[52] U.S. Cl. .................................... 373/79; 373/80; 373/86; 75/436; 222/503; 432/241
[58] Field of Search .................... 373/42, 43, 45, 79, 373/78, 80, 81, 83, 84, 86, 2, 72; 222/503, 558; 75/436, 10.62, 10.63; 432/241

[56] References Cited

U.S. PATENT DOCUMENTS

| | | | |
|---|---|---|---|
| 3,147,107 | 9/1964 | Brooke et al. | 373/81 |
| 3,444,304 | 5/1969 | Longenecker | 373/2 |
| 4,262,825 | 4/1981 | Jacobson et al. | 222/503 |
| 4,543,124 | 9/1985 | Vallomy | 373/79 |

FOREIGN PATENT DOCUMENTS

| | | |
|---|---|---|
| PCT/US85/-01473 | 7/1985 | |
| 0225939 | 9/1978 | European Pat. Off. . |
| 0197210 | 10/1986 | European Pat. Off. . |
| 0225939 | 6/1987 | European Pat. Off. . |
| 2435684 | 4/1980 | France . |
| 972100 | 7/1949 | Germany . |
| 896814 | 11/1953 | Germany . |
| 2612674 | 9/1977 | Germany . |
| 3216102 | 10/1983 | Germany . |
| 736115 | 8/1955 | United Kingdom . |

OTHER PUBLICATIONS

"Application ofstate of theart technology for compact electric arc furnace steel plants"–865 Iron & Steel Engineer–64 (1987) May, No. 5.

Primary Examiner—Bruce A. Reynolds
Assistant Examiner—Tu Hoang
Attorney, Agent, or Firm—Pollock, Vande Sande & Priddy

[57] ABSTRACT

Installation for producing steel by melting scrap comprising an electric furnace (2') supplied with individual batches of scrap sequentially charged into the furnace after preheating in a preheating chamber (4) forming a batch container open at both ends and having a releasable bottom. The preheating chamber is mounted on a transporting device for movement between a first, preheating position, in which it is connected to a hot gas circulating circuit, and a second position in which it empties the batch of preheated scrap into the furnace. The lower portion of the side wall of the preheating chamber (4) forms a skirt (43) with a wide downwardly directed opening, and the chamber (4) is combined, in the preheating position, with a movable device (54) for sealably engaging the lower end (42) of the skirt (43) with a matching stationary base plate (3), whereby the skirt is sealed in the preheating position.

20 Claims, 7 Drawing Sheets

INSTALLATION FOR PRODUCING MOLTEN METAL IN AN ELECTRIC FURNACE

FIELD OF THE INVENTION

This invention relates to an installation for producing metal, such as steel, by melting iron material, such as scrap, in an electric arc furnace. For many years now, electric arc furnaces have been one of the most popular means of producing steel by melting down scrap or other ferrous raw materials such as prereduced ores.

BACKGROUND OF THE INVENTION

An electric arc furnace generally comprises a melting vessel made up of a refractory hearth and surrounding sidewalls, a removable roof that closes the vessel, the vessel being associated with one or more electrodes connected to a current source. Each electrode is fitted to the end of a supporting arm overhanging the vessel and penetrates vertically into the vessel through a special hole made for this purpose in the removable roof. The furnace can be supplied either from an alternating current source using three electrodes, or from a direct current source using one or more electrodes. In this case, one or more electrodes are used, each passing through the vault of the furnace and each associated with one or more electrodes mounted in the hearth and each connected to the current source by a return conductor. The furnace is of course associated with a certain number of other items of equipment such as the electrical installations, scrap and additive charging devices, devices for evacuating the molten steel and slag and fume evacuating circuits.

It is further useful in order to improve the efficiency of the furnace to provide a means of preheating the scrap charge before loading it into the furnace. A popular preheating method for doing this consists in passing hot gasses through a preheating enclosure.

This fairly complex assembly of costly, bulky apparatus is installed in a building that is normally arranged in three zones: a scrap metal reception and recovery zone, a preheating zone and a metal-making zone.

The raw scrap is brought to the reception zone in one or more transport containers or "buckets". The buckets are picked up and carried between zones by an overhead travelling crane running the whole length of the installation.

The bottom of each bucket is generally made up of two shells, each pivoted about a horizontal axis, and which, by moving away from each other, let the charge fall into the vessel, the roof of which having been opened. The roof vault and electrodes can be suspended from a gantry that can move horizontally or, preferably, suspended from arms that swing horizontally about a vertical axis on a base next to the furnace.

Because steel production generates a large volume of hot and dusty gasses during the heating and metal-making stages, the resulting fumes are collected by a hood connected to an outwardly fume evacuation circuit via a dedusting means.

The hot gases serving to preheat the scrap can be produced from these fumes in a combustion chamber which serves to burn off carbon monoxide and other unburnt residue and also to recover a part of the dust carried by the fumes. The burnt gases are directed to one or more preheating cells containing scrap waiting to be loaded into the vessel of the furnace.

The travelling crane picks up a bucket from the reception zone, each bucket containing a load of cold scrap, and carries it to the preheating cell where it is left for the necessary period of time. After preheating, the crane picks up the bucket and positions it over the vessel, the scrap then being dropped into the vessel by opening the bottom of the bucket.

During the charging operation, the roof is open, and a large quantity of fumes escape uncollected. Steel and slag may also be projected out of the furnace as the scrap falls into the vessel.

Steel producing installations are also very noisy, and so one design objective is to provide as much insulation as possible in order to reduce fume and noise pollution.

To this end, it has been suggested to combine the preheating zone and the metal-making zone in a closed chamber within which the majority of the fumes and dust produced can be collected and sucked out by a hood connected to a dedusting circuit. An installation of this kind is described, for example, in U.S. Pat. No. 4,506,370. In this installation, scrap is preheated in a chamber next to the furnace, the whole assembly being placed inside a chamber of a relatively reduced size. The preheating chamber is limited by a tubular side wall having a top and bottom that can be closed in a movable fashion. The hot fumes from the furnace are collected by a duct opening into the upper portion of the chamber in which burners are fitted, thus constituting the combustion chamber. The burnt gases flow through the chamber and leave through a lower opening connected to a duct that vents to atmosphere.

More importantly, the preheating chamber is further designed as a container with an opening for charging the furnace with scrap. The chamber is mounted on a support carriage or travelling crane which carries the chamber between the preheating position next to the furnace and the unloading position directly above the furnace where the scrap is emptied directly into the vessel by releasing the opening bottom.

The chamber is loaded with a new charge of scrap outside the closed chamber by a conventional loading bucket.

The support carriage that carries the preheating chamber moves it accordingly to the following positions and in the following order: 1) the cold scrap loading position outside the closed chamber; 2) the preheating position next to the furnace, the chamber being coupled to hot gas input and output ducts; 3) the unloading position above the furnace.

The fume collecting chamber must be fitted with a first gate so that the preheating chamber can move between the cold scrap loading position outside the chamber and the preheating position.

After the melting stage, the steel is poured into ladles which must themselves be moved in and out through another opening fitted with a second gate.

The large size of these gates represents a leak risk, and that maneuvering the gates hinders the operation of the furnace.

Moreover, the chamber transfer carriage is relatively bulky and has to travel an appreciable distance between the cold scrap loading position outside the furnace and the scrap unloading position above the furnace. Needless to say, the path travelled by the transfer carriage and chamber must be clear, and, more importantly, the gas circuits must be set out in such a way as to ensure easy connection and disconnection and likewise stay clear of the path of the transfer carriage.

To overcome these drawbacks, EP-0 225 939 suggests that the preheating and loading chamber be stationary and the furnace movable. The dimensions of the fume evacuation chamber can be significantly reduced, the chamber reduced in fact to simply an upper section surrounding the base of the preheating chamber designed to allow the bottom to open, and a lower section occupied by the furnace, the furnace being mounted on a transfer carriage that moves between the unloading position in which the furnace is positioned beneath the preheating chamber, and the metal-making position outside the fume collection chamber. In this position the furnace is closed off by the roof carrying the electrodes and comprising a hole that connects to a fume evacuation pipe leading to the combustion chamber installed in the top part of the stationary preheating chamber. The advantages of such an arrangement are that the dimensions of the fume collecting chamber can be reduced and that the chamber only requires a single gate for the passage of the furnace. Moreover, except for the removable connection on the furnace roof, all the hot gas circuits are stationary and can be arranged around the preheating chamber.

The furnace, however, must be mounted on a movable carriage and fixed to the cradle in a removable manner which allows the furnace to be tilted in the usual way to pour the molten metal. Such an arrangement, however, complicates the installation, given the size and weight of the furnace. In addition, since the preheating chamber is stationary, cold scrap is loaded in a zone containing the various hot gas circulation circuits and could therefore be damaged, as could the combustion chamber in the top part of the chamber.

SUMMARY OF THE INVENTION

One object of the invention is therefore to provide a new arrangement which overcomes the drawbacks of existing arrangements while retaining their advantages. In particular, the invention completely eliminates the fume collection chamber and consequent gate maneuvering operations, largely simplifies the gas circulation circuits, provides a more compact installation and enhances safety.

The invention therefore concerns in general an installation for producing a metal such as steel by melting a charge of iron material such as scrap. It comprises at least one electric furnace made up of a melting vessel closed by a removable roof and at least one electrode connected to a current source and penetrating vertically into the vessel through the roof, and means for supplying individual loads that are emptied in sequence into the furnace, and a preheating chamber delimited by a side wall having upper and lower open ends, and inside of which is arranged a loading container fitted with an opening bottom, the chamber being associated, at least in a preheating position, with movable means of closing the two ends in a substantially sealing manner, and with means of movably connecting the chamber, on two levels offset in height, to respectively one inlet duct and one outlet duct through which passes a flow of hot gas used to preheat the load contained in the container, and a device for transporting the chamber together with the loading container between the preheating position and the unloading position directly above the furnace vessel where the charge is emptied into the vessel by opening the bottom.

In accordance with the invention, the lower portion of the side wall of the preheating chamber forms a skirt with a wide downwardly directed opening, the chamber being combined, in the preheating position, with movable means for sealably engaging the lower end of the said skirt with a stationary base plate shaped to match the lower end, whereby the skirt is sealed in the preheating position.

Preferably, the preheating chamber is carried by the transporting device using lifting means that can raise and lower the chamber between an upper level for transporting the chamber between the preheating position and the unloading position, and a lower level at which the lower end of the skirt sealably engages with the closing base plate.

The installation is normally installed in a building comprising an access floor placed at the side wall of the furnace vessel. In this case, the base that closes the chamber is arranged on a circulation floor placed at the upper portion of the furnace vessel.

Advantageously, the shape of the lower end of the skirt closely matches that of the upper edge of the furnace vessel, so that the skirt forms a hood in the unloading position for upwardly directing fumes from the furnace into the chamber and which thus constitutes an evacuation chimney for the fumes, it also being possible to arrange the skirt to guide the downward descent of the load into the furnace vessel.

Once the preheating chamber has been moved and positioned above the vessel, the lifting means cause the chamber to lower in such a way that the lower end of the skirt stops substantially close to the level of the upper edge of the vessel.

When the opening bottom of the loading chamber comprises at least two raisable shells, the skirt is lifted above the level of the bottom so that it surrounds the side wall at a certain distance from it, and a closed annular space made towards the top into which the shells rise.

Preferably, the side wall of the skirt is fitted with a pipe associated with a movable means of connecting to one of the branches of the hot gas circulation circuit.

Moreover, the means for closing the upper end of the preheating chamber is a roof which is mounted on a support that offers a small range of vertical movement for setting down and raising the roof from the container, and also a range of horizontal movement allowing the roof to be swung away from the container after it has been raised.

In a particularly advantageous embodiment that confers, in particular, greater safety, the device for transporting the loading container comprises at least one arm arranged so as to pivot about a vertical axis on a stationary base located between the reception zone and the metal-making zone, the overhanging arm extending up to the free end to which are fitted means for supporting the loading container, the arm being associated with a means of controlling its rotation about its axis in order to move the loading container along a circular arc between the preheating position and the position in which the scrap is emptied into the furnace vessel, and conversely.

The loading container can be mounted on the transporting device in a permanent or removable manner.

In the first case, the transporting device is first placed in the preheating position and the container loaded with cold scrap, normally by means of a bucket, its roof then being closed and the chamber thus formed being connected to the stationary gas input and output ducts. After preheating, the ducts are disconnected and the transporting device then carries the container to the unloading position above the furnace vessel whose closing vault has been removed from the vessel.

In the second case, the chamber is loaded away from the preheating zone, the roof remaining carried by the transporting device. After the chamber has been placed in the preheating position on the transporting device, the roof is closed on the chamber and the hot gas circuits connected.

In this way several preloaded chambers are available in advance.

The roof of the preheating chamber may be lifted and moved away before the preheating chamber is moved to the unloading position above the furnace. However, it is also possible to keep the roof in position, the gas evacuation hole being connected in a removable way to a duct for evacuating fumes from the furnace.

The chamber transporting device carries a loading bin for additional products, integral in motion with the preheating chamber and arranged on the transporting device in such a way that it passes above the furnace vessel before or after the preheating chamber reaches the unloading position, in an intermediary additive unloading position.

The use of a specific transporting device to carry the preheating chamber between the reception zone and metal-making zone also makes it possible to arrange the installation in a building comprising two parallel, adjacent halls, one being the preparation hall containing the reception and preheating zones, and the other the metal-making hall containing the furnace, the transporting device being placed at the meeting point of the two halls to carry the loading chamber from one hall to the other.

The furnace vessel comprises, as is normally the case, a hearth made from a refractory material with a surrounding side wall containing an opening for pouring the molten metal and at least one opening for deslagging and evacuating slag.

According to another characteristic of the invention, the section of the deslagging opening is just sufficient to allow passage of the slag, the height of the circulation floor above the opening being such that most of the side wall is below the floor and that the upper edge of the vessel protrudes only a small distance above the floor, this distance being less than the height of a man, therefore allowing the inside of the vessel to be directly inspected from the floor once the vessel roof has been opened.

BRIEF DESCRIPTION OF THE DRAWING

The invention will become readily apparent by reference to the following detailed description of a number of embodiments given as examples and shown in the appended drawings, in which.

DESCRIPTION OF THE PREFERRED EMBODIMENT

Figure 1:
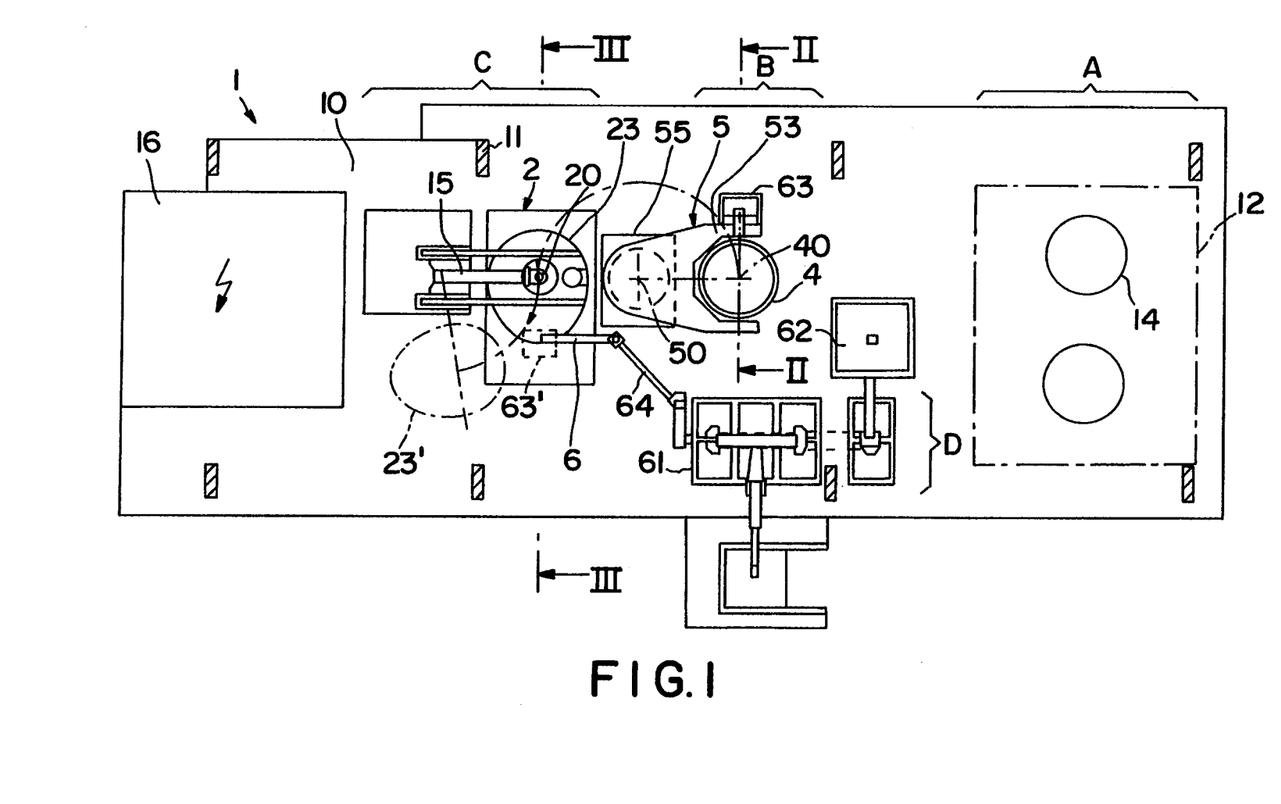
FIG. 1 is a schematic plan view of the whole installation.
Figure 2:
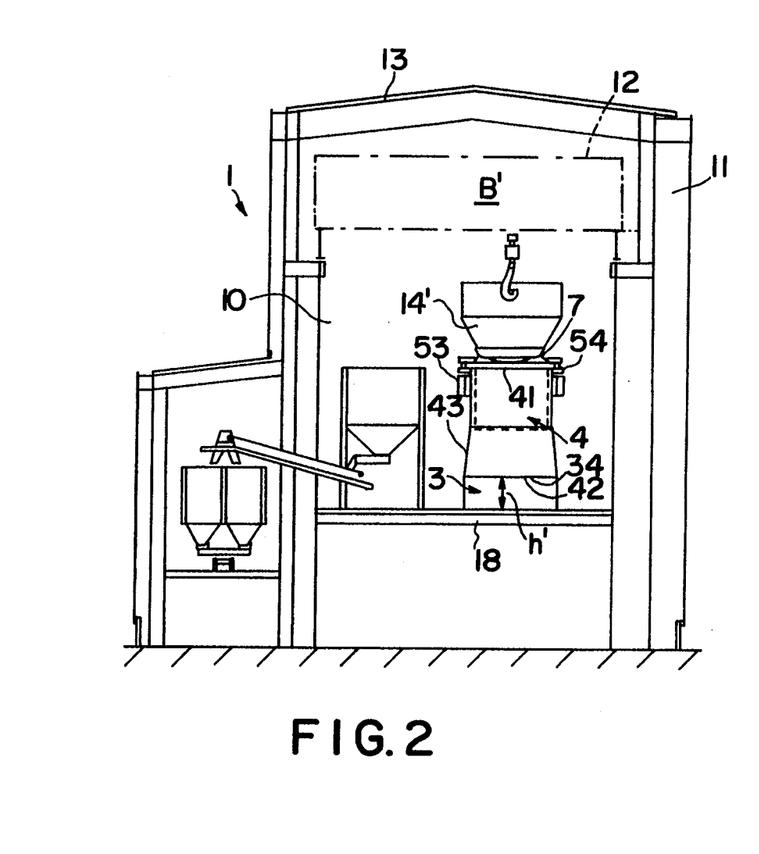
FIG. 2 is a cross-sectional view along line II—II of FIG. 1.
Figure 3:
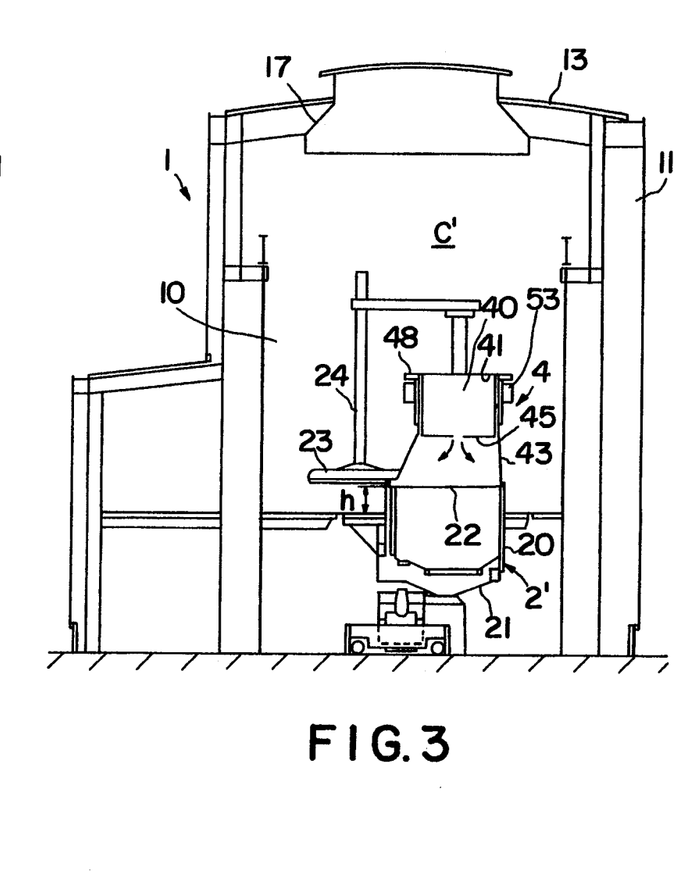
FIG. 3 is a cross-sectional view according along line III—III of FIG. 1.

FIGS. 1, 2 and 3 show in schematic form an entire metal-making installation arranged inside a building 1 comprising, in the example shown, a main hall 10 whose limit is defined by pillars 11 supporting a travelling crane 12, the hall being covered by a roof 13.

Hall 10 contains a scrap reception zone A, a preheating zone B and a metal-making zone C. Generally speaking, steel production requires the addition of additives which in this example are prepared and stocked in a zone D in hall 10 or in an adjoining hall.

Electric furnace 2 in the metal-making zone comprises a vessel 2' made up of a hearth 8 and a collar 20 and closed by a roof 23 through which passes at least one electrode 24 connected to a current source and penetrating vertically through roof 23 into the vessel 2'. As shown in FIG. 1, roof 23 comprises a vault suspended from the end of an overhanging arm which extends from a base 15, and arranged so as to pivot about a vertical axis and move the vault to position 23' shown by dotted lines in FIG. 1, and in which the vessel is left completely clear.

Similarly, each electrode 24 is mounted at the end of an arm that also pivots about a vertical axis on base 15.

All these arrangements are conventional features and do not call for in-depth detail. In the example shown, furnace 2 comprises a single electrode and therefore functions by direct current. It could also be fitted with several electrodes and supplied by alternating current.

The scrap to be melted in the electric furnace arrives in the raw, cold state in reception zone A, in one or more containers generally designated as "buckets". Each bucket 14 is in the form of a ladle that is open at the top and bottom, the lower opening being closed by a bottom 15 made up of two shells which can move away from each other by rotation about a horizontal axis.

As already indicated, the scrap is preheated inside chamber 4 which contains a loading container 40 with an opening bottom, and which is mounted on a transporting device 5 which enables the container to move between two predetermined positions, i.e., position B' where cold scrap is loaded as shown in FIG. 2, and position C' where scrap is unloaded into the furnace, as shown in FIG. 3. The preheating chamber is delimited by a tubular side wall having a vertical axis and largely opening upwards at its upper end 41 and also downwards at its lower end 42, respectively.

Inside side wall 4 sits a loading container 40 fitted with an opening bottom 45 which, in the example shown, comprises two gates arranged to swing about a horizontal axis.

Moreover, the lower part of chamber 4 forms a skirt 43 which surrounds opening bottom 45 and extends downwards below the level thereof.

The preheating and loading chamber 4 thus formed is supported, for example, by means of suspension lugs 48 by a transporting device 5 enabling the chamber to move between scrap loading position B' and furnace loading position C'. This transporting device could be a simple carriage that rolls on rails but, according to one of the characteristics of the invention, a specific device is used in preference and this will be described hereinbelow.

As shown schematically in FIGS. 2 and 3, building 1 in which the installation is arranged comprises a circulation floor 18 at the furnace collar 20, this being arranged, as is the usual practice, on a chassis 21 forming a cradle which is supported by a foundation block and which can be rocked slightly backwards and forwards.

To allow the furnace to be rocked in one direction or the other, circulation floor 18 is fitted with a large opening covered by an auxiliary floor 19 that is an integral part of furnace chassis 21.

The upper edge 22 of furnace vessel 20 is therefore at a height h above floor 18.

As shown in FIG. 2, in the preheating position B', chamber 4 is supported by a fixed base 3 which rests on circulation floor 18, base 3 being made up of, for example, a cylindrical vertical wall closed at the bottom by floor 18 and open at the top along an upper edge 34 whose shape matches that of lower end 42 of skirt 43, which said the upper edge being at height h' above floor 18, this height h' being substantially equal to the same height h of the upper edge 22 of the furnace vessel 20. Moreover, chamber 4 rests on transporting device 5 by means of a lifting device 54 made up, for example, of two jacks placed each side of chamber 4 and which bear on lugs 48 fitted to the chamber 4.

The lifting device 54 allows chamber 4 to be raised and lowered between two levels, namely, an upper level corresponding to the transport level, and a lower level at which lower edge 42 of skirt 43 sealably engages on the upper edge 34 of base 3, thus forming, in preheating position B', a sealing means for closing the lower end of chamber 4.

Moreover, upper end 41 of chamber 4 is closed by a movable roof 7 which can be raised and lowered, and moved sideways to open upper opening 41.

When chamber 4 is placed on base 3 in the preheating position, roof 7 is first moved away so that bucket 14' can empty a load of cold scrap, as shown in FIG. 2.

Roof 7 is then closed again and chamber 4 and constitutes a closed chamber into which a hot gas flow can be fed.

These gases are advantageously produced in the normal way by burning the fumes leaving furnace 2 through a pipe 26 connected to a hole in roof 23, which pipe 26 can be connected in a movable way to a duct 33 which carries the fumes to a combustion chamber where they are burnt to produce the hot gases that are used to preheat the scrap.

In prior art installations, the fumes are immediately directed to the preheating chamber, the upper part of which is fitted with burners to form a combustion chamber. However, such an arrangement complicates the construction of the preheating chamber and can also hinder the introduction of the cold charge which may damage the combustion chamber.

By contrast, in the invention, combustion chamber 30 is placed beneath circulation floor 18 and, preferably, directly below base 3.

In this way, roof 7 is a simple obturation element of simple and light construction, and upper edge 41 of chamber 4 is completely clear once the roof has been removed.

Moreover, evacuation duct 33 which directs fumes to combustion chamber 30 is elbowed immediately after its connection to the outlet of pipe 26 connected to roof 23 of the furnace, and runs downwards below floor 18, thus freeing all the space above the furnace. In addition, the position of pipe 26 on roof 23 can be chosen to ensure that duct 33 does not obstruct the movement of the preheating chamber by transporting device 5.

The same applies to duct 35 which evacuates hot gases to the preheating chamber and to the deduster which can also extend below floor 18 without obstructing the movement of chamber 4.

In this way, all the space above floor 18 and around the preheating chamber is completely free of obstructions, and it is therefore possible to move loading bucket 14' to preheating position B' directly above chamber 4, as shown in FIG. 2, without any risk of damaging the gas circuits. Consequently, the container no longer has to be moved to a third position in order to be loaded with cold scrap, and this makes for simplified handling.

It should also be noted that, because of the effective sealing provided on the preheating chamber and the fact that nearly all circuits are below floor 18, all gate handling maneuvers are eliminated and a closed fume capturing chamber is no longer required.

It is even more advantageous to move preheating chamber 4 between preheating position B' and loading position C' by means of a rocking transporting device, as shown in FIGS. 4 to 8.

To this, end chamber 4 is suspended from the end of an overhanging arm 51 that can swing horizontally about a vertical axis 50 on supporting block 52 next to the furnace 2.

Chamber 4 engages between the two arms of a fork 53 at the free end of arm 51.

As a result, when arm 51 moves chamber 4 from the preheating position B' away from the furnace to unloading position C', the axis of chamber 4, as shown in FIG. 1, follows a path corresponding to the arc of a circle centered on axis 50, the position of axis 50 being chosen in such a way that, after container 4 has been rotated and positioned above the furnace, the axis of container 4 is aligned with the axis of furnace vessel 2'.

Figure 4:
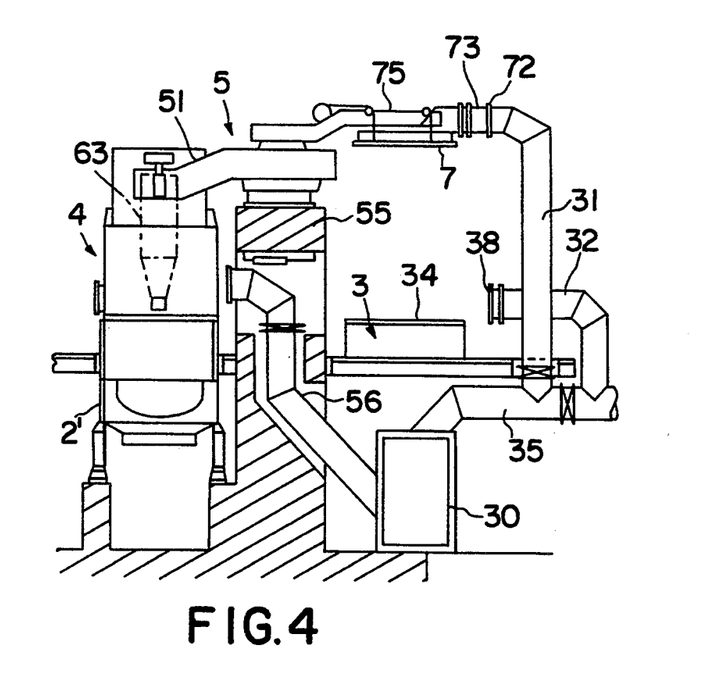
FIG. 4 is a cross-sectional view along line IV—IV of FIG. 3.

As shown in FIG. 4, the means for lifting chamber 4 comprise two jacks 54 mounted on the two branches 53 of arm 51, which, as described earlier, allow the height of the chamber to be controlled in a limited way between the upper transport position and lower closed position.

Figure 8:
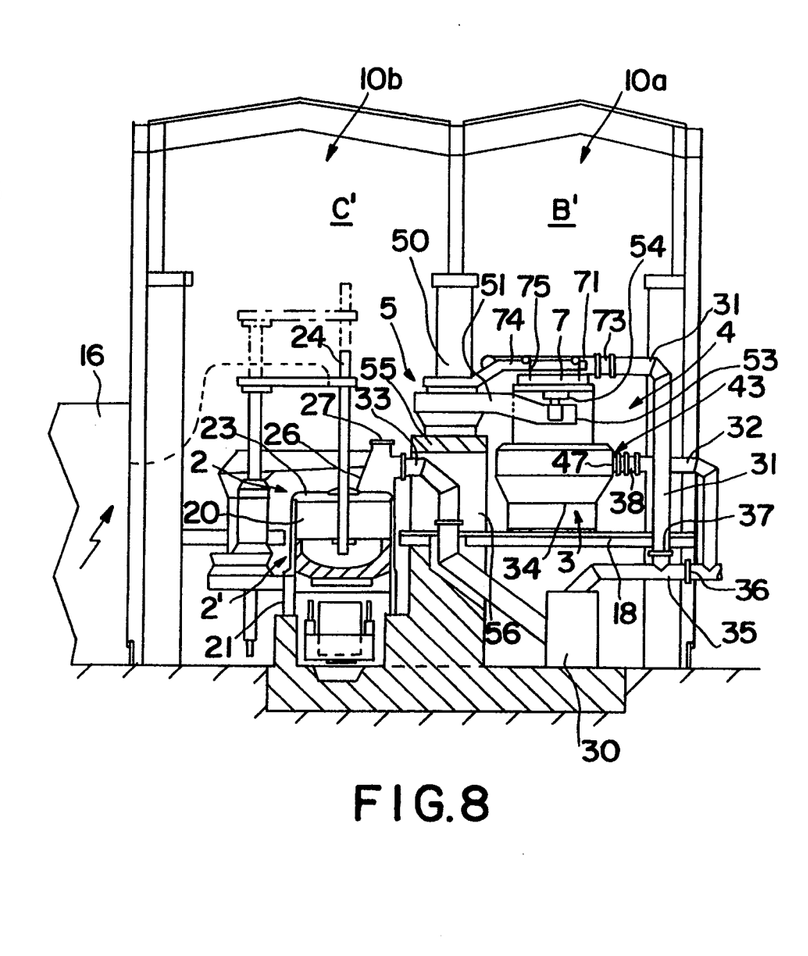
FIG. 8 is a cross-sectional schematic view along line VIII/VIII of FIG. 7.

A detailed diagram of the gas circulation circuits is given in FIG. 8, which shows the whole installation operating in the preheating position.

In this position, furnace 2 is operating, with roof 23 closed and electrode 24 lowered. Transporting device 5 has been swung away from furnace 2 through 180° in order to place preheating chamber 4 on top of enclosed base 3 on floor 18. The pressure that chamber 4 exerts on base 3 can be adjusted by means of jacks 54, with most of the load being supported by arm 51.

Fume evacuation duct 33 can be run through support block 52 to connect to combustion chamber 30 underneath floor 18. This reduces the length of the circuit and also affords it better protection. The gases produced by the combustion process are directed to the dedusting and evacuation circuit via output duct 35, which is branched to duct 31 which extends above floor 18 and whose upper end is connected by means of a movable joint 73 to pipe 71 fitted on roof 7.

Valves 36 and 37, fitted downstream of the branch on ducts 35 and 31, respectively, provide a means of directing the gas either to chamber 4 through duct 31 or straight to the deduster through duct 35.

Moreover, the lower portion of chamber 4 is fitted with a pipe 47 which, when chamber 4 is set down on base 3, comes face to face with the end of a by-pass duct 32, the end being fitted with a movable connecting device 38. The other end of duct 32 connects to duct 35 downstream of valve 36.

Moreover, when valve 36 is shut and valve 37 open, the fumes leaving the furnace via duct 33 are first burnt in combustion chamber 30 in order to produce hot gases which leave chamber 30 through output duct 35 and flow upwards through duct 31 into the upper part of chamber 4. Since the lower part of chamber 4 is sealed against base 3, the gases descending inside chamber 4 transfer their heat to the scrap charge contained in container 40, flow into skirt 43 through bottom 45 which is unsealed, and then flow outside the container through pipe 47 and evacuation duct 32 which is connected to duct 35 downstream of valve 36.

The gas circulation process described above corresponds to steady operation, i.e., one load of scrap in the process of being melted in the furnace while a cold load is preheated in chamber 4.

However, on starting up the installation, chamber 4 is used only to load cold scrap into the furnace. Valve 36 is open and valve 37 shut so that the gases produced in the furnace flow directly to the dedusting installation through duct 35.

When furnace 2 needs to be fed with more scrap, electrode 24 is raised and duct 33 disconnected so that roof 23 can be opened. Ducts 31 and 72 are also disconnected from pipes 47 and 71, respectively. Roof 7 is removed and the container 4 thus freed is rotated through 180° by transporting device 5 to the position above furnace vessel 2' as shown in FIGS. 3 and 4. The preheated scrap is then emptied into vessel 2'.

Figure 5:
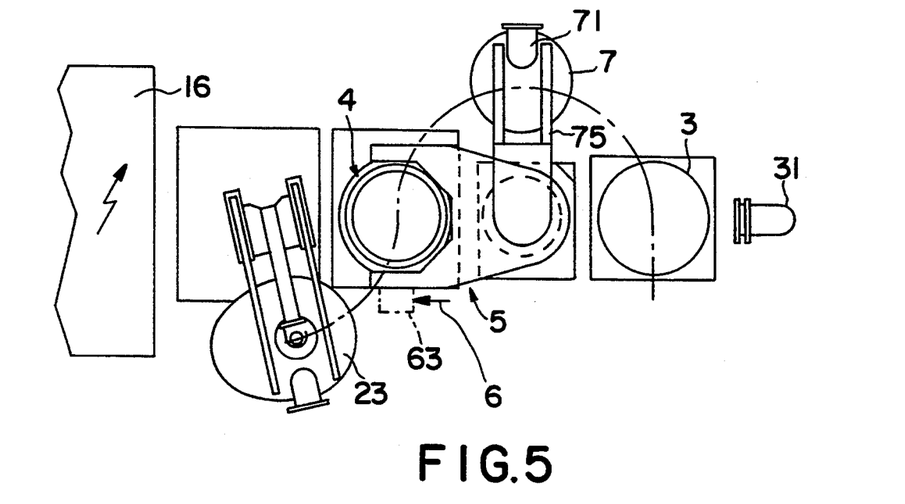
FIG. 5 is a schematic plan view of the installation shown in FIG. 4 showing the position in which scrap is emptied into furnace 1.

According to another advantageous arrangement, shown in FIGS. 3 and 5, the shape of lower opening 42 of skirt 43 is substantially identical to that of the upper edge of collar 20 on vessel 2' of furnace 2.

Collar 20 is often cylindrical, and in this case the shape of opening 42 is made round and of the same diameter.

Figure 6:
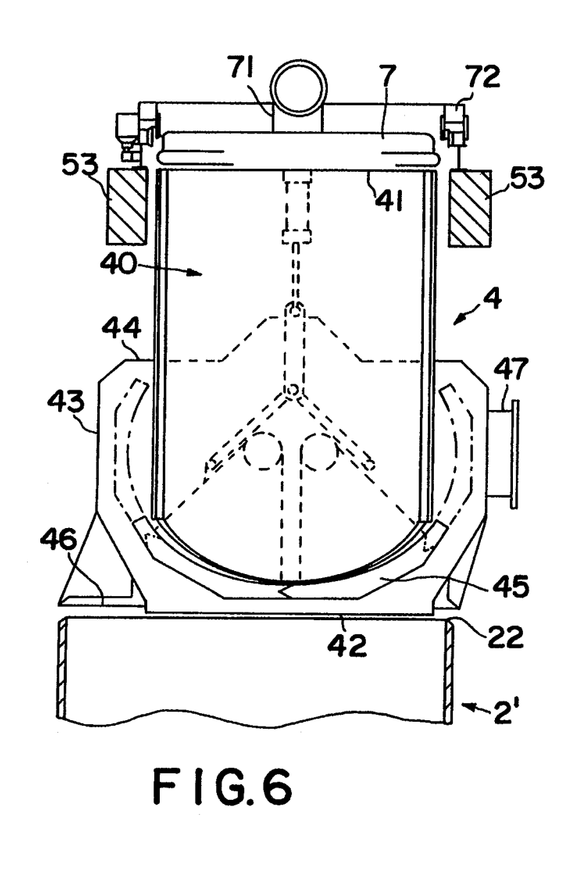
FIG. 6 is an elevational and enlarged scale view of a preferred embodiment for the preheating and loading chamber.

However, the shape of collar 20 and roof 23 is sometimes ovoid in order to cover the steel pouring lip normally located on one side of furnace hearth 8. In this case, lower end 42 of skirt 43 can be given the same ovoid shape. However, as indicated in FIG. 6, the shape of skirt 43 can also be circular and of the same diameter as the furnace, with opening 42 simply extended on one side by a plate 46 adapted to cover the oval part of the furnace corresponding to the pouring lip.

Thus, when container 4 is placed above the furnace vessel 2', vessel 2' is completely covered by base 45, 46, of skirt 43 which, thanks to the lifting system 54, can be placed extremely close to upper edge 22 of side wall 20 of vessel 2', and thus constitutes a guide hood offering substantial sealing for gases flowing into chamber 4 forming a chimney that directs the gases straight to suction hood 17.

In this connection, it should also be noted that charging the furnace using a moving preheating chamber obviate the need to place a travelling crane in the path of the fumes.

Moreover, the lower part of skirt 43 can be designed so that it directs scrap toward the center of furnace vessel 2', thus reducing the risk of scrap being deposited around the edges of the hearth and of damage being caused to side wall 20.

If opening bottom 45 is made from two shells pivoted about horizontal axes, it is of interest to use the arrangement shown in detail in FIG. 6.

In this case, skirt 43 can be raised to above the level of bottom 42 of container 40, thereby surrounding the lower portion of side wall 4 with a certain spacing which provides an annular space closed at the top by a wall 44 and into which the two closing shells 45 can be raised. Skirt 43 can taper downwards onto lower opening 42 to guide scrap into the furnace.

In the embodiment method shown in FIG. 6, roof 7 is carried by a carriage 72 and suspended, for example, from suspension cables 75 which can be used to raise or lower roof 7. After roof 7 has been raised, carriage 72 travels along rails mounted on the two branches 53 of arm 51 of transporting device 5 and moves roof 7 away, thereby opening upper opening 41 of chamber 4, which can be replaced on the container by reversing the foregoing operations.

According to another arrangement shown in FIGS. 4, 5 and 8, roof 7 is suspended from an auxiliary arm 74 pivotally mounted above the latter one about vertical axis 50 of arm 51.

It is thus possible to move roof 7 independently of chamber 4.

When roof 7 is raised, auxiliary arm 74 follows the movement of arm 51 and container 4, but is held in the transversal position 7' shown in FIG. 3, and is left in this position when chamber 4 returns to the preheating position B' after emptying the preheated scrap charge into the furnace 2. Upper hole 41 thus remains open and allows the introduction into container 40 of a new load of cold scrap brought by a bucket 14 suspended from the travelling crane. The container 4 is lowered onto base 3 and the roof 7 brought to a position above the top of the container 4 by rotating arm 7. The roof is then lowered onto the container to hermetically close opening 41 and hot gas supply duct 31, and evacuation duct 32 are then connected. Chamber 4 is now in position, ready for the preheating of the new load.

Many advantages are gained by using a pivoting device 5 to support and transport loading container 4.

In fact, preheating chamber 4 travels at a constant height between the two fixed positions, respectively the preheating position and the position from which it empties scrap into the vessel, along a circular, well determined path that passes around support block 55 and furnace 2. The path travelled and the level of displacement is therefore known precisely, with the zone covered by chamber 4 being smaller and less cluttered than would be the case if the chamber were moved by translation on a carriage. In particular, the different devices, and more importantly all the gas circulation ducts, can be positioned so that they remain distanced at all times from chamber 4, which can thus be transported in total safety.

It can be seen, in particular in FIG. 1, that by pivoting about axis 50, chamber 4 remains on one side of the vertical median plane passing through axis C' of vessel 2' and axis B'_of base 3, and arrives over the vessel following a direction perpendicular to this plane, roof 23 of the furnace along with the ancillary devices being swung away to the other side. The risks of interference are therefore limited even though the overall assembly is more compact.

The positioning and dimensions of transporting device 5 will be provided with this end in mind, and will take account of, in particular, the shape of hall 10 and the layout of the different devices.

Thus, in the example shown in FIG. 1, the different devices are positioned and aligned with one another inside a single hall 10, support arm 51 turning by 180° between the loading position and the unloading position. This leaves an entire side of the hall available, in particular for devices that supply additives from a certain number of bins 61.

Figure 7:
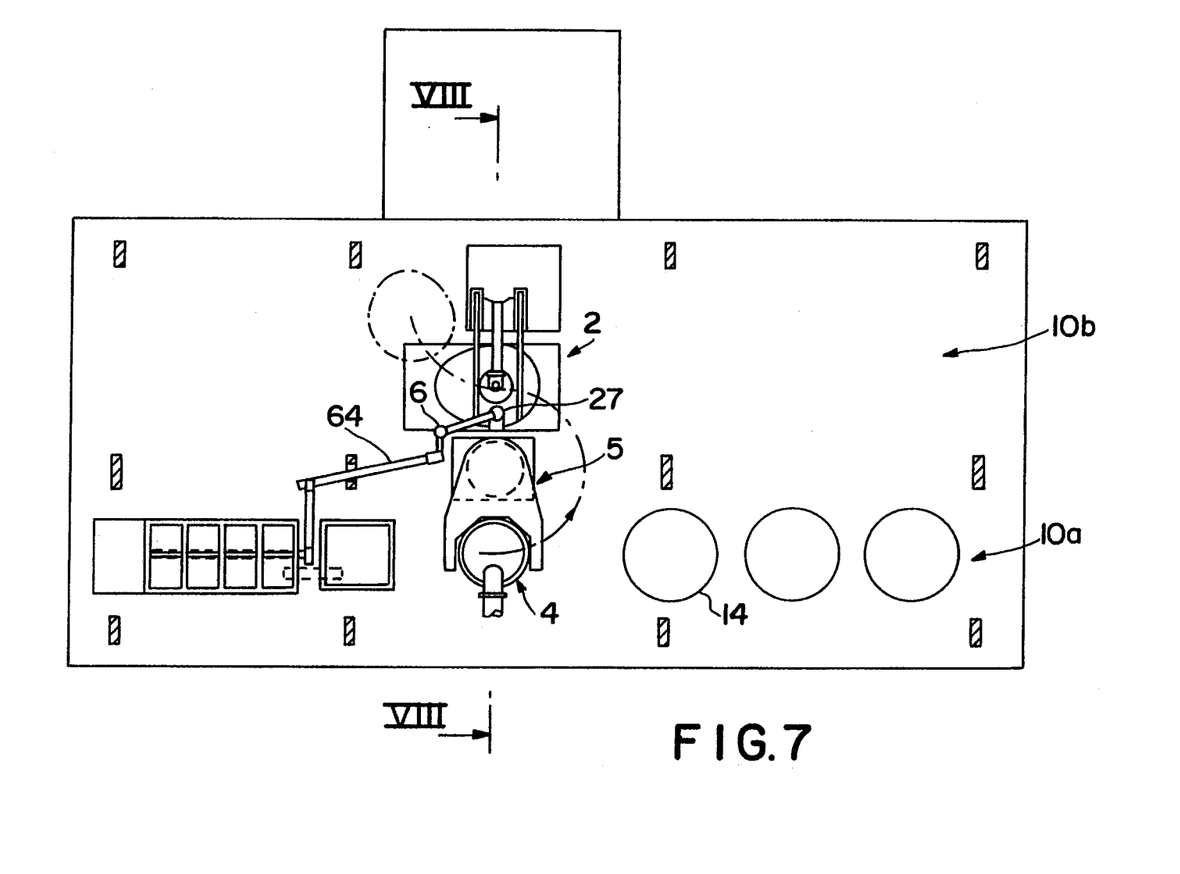
FIG. 7 is a top plan view of an installation in a two-hall building.

Thanks to the use of the turning transporting device that moves between the preheating and metal-making zones, it is particularly advantageous to arrange the installation in two parallel halls 10a and 10b, as shown in FIGS. 7 and 8, respectively, hall 10a containing the reception zone A, preheating zone B and additive preparation zone D while hall 10b contains only the furnace installed on a pouring floor free of all obstructions. All bucket handling is therefore performed in hall 10a. Hall 10b can be fitted with a travelling crane required simply for maintenance purposes.

This arrangement makes it much easier to isolate the furnace and collect fumes, with all gas circuits being brought into preparation hall 10a.

The arrangements according to the invention allow, in a general way, the various operations to be carried out in an easier and more practical way, and make for less pollution and lower heat losses, particularly because of the reduced time for opening the roof.

For example, pivoting transporting device 5 that carries chamber 4 allows additives such as limestone flux, lime, coal, etc. to be more easily introduced into the vessel, before or after the scrap has been introduced.

In fact, as shown in dot-dash lines in FIGS. 1, 4 and 5, arm 51 on pivot 5 can be fitted with an auxiliary bin 63 placed next to chamber 4 substantially in its meridian plane.

In this way, as clearly shown in FIG. 5, when arm 5 is swung around, auxiliary bin 63 moves with chamber 4 and passes overhead the furnace before chamber 4. This allows preloaded additives to be emptied into the furnace when the bin passes above the furnace.

However, it is preferable, as indicated in FIG. 1, to place a certain number of bins 61 in zone D for storing different additives associated with continuous loading means 6 that ends overhead the position occupied by bin 63 when the bin itself passes above the furnace. The last section of loading means 6 could be formed, for example, by a chute 64 that can be pivoted to clear the space above the furnace to allow roof 23 to be rotated.

Loading chute 6 can also end above the auxiliary bin 63 located next to chamber 4 when the bin is aligned with the axis of the furnace, as shown in FIGS. 1 and 5. Here it is sufficient to arrange the output of bin 63 so that it pours into the furnace vessel through skirt 43.

However, according to another advantageous arrangement, shown in FIG. 8, since fume evacuation duct 33 is elbowed downwards immediately after the output of pipe 26 in order to direct the fumes to combustion chamber 30 underneath floor 18, it is also possible to provide a hole 27 in the upper part of fume evacuation pipe 26, the hole 27 being closed in a movable way and into which additive charging device 6 is able to directly empty additives into the furnace without it being necessary to open roof 23, and consequently minimizing heat losses and fume emissions during melting operations.

In the examples shown, preheating chamber 4 is permanently fixed onto transporting device 5 and loaded with cold scrap in the preheating position. However, it would also be simple to fit chamber 4 in a movable way on to arms 5 of the pivot whose fork-shaped form allows easy introduction. Cold scrap could therefore be loaded into chamber 4 in a third position and then the chamber put back onto arm 51. This would minimize even further the risk of damage to gas circuits, although with the drawback of having an additional means of transporting preheating chamber 4.

In addition, the drawings show that only supply duct 31 and evacuation duct 32 connected to preheating container 4 extend above floor 18, and that the greater portion of the gas circulation and evacuation circuits is placed underneath this floor along with combustion chamber 30, thus restricting the zone in which fume and dust emissions can occur to the upper part, this zone being well isolated by base 55 from the metal-making zone C, particularly when building 1 comprises two separate halls.

Figure 9:
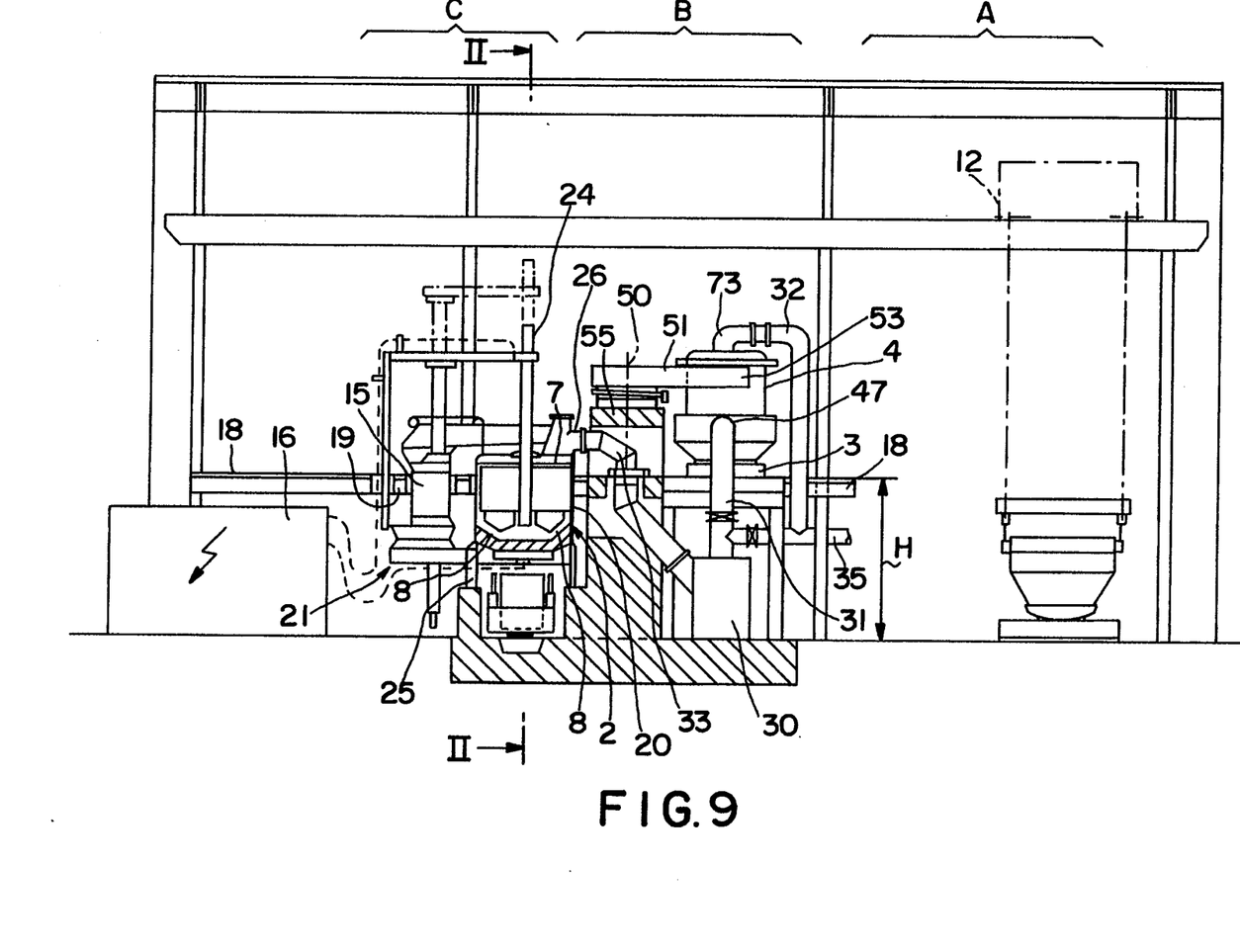
FIG. 9 is an elevational schematic view of the whole installation according to a different arrangement.
Figure 10:
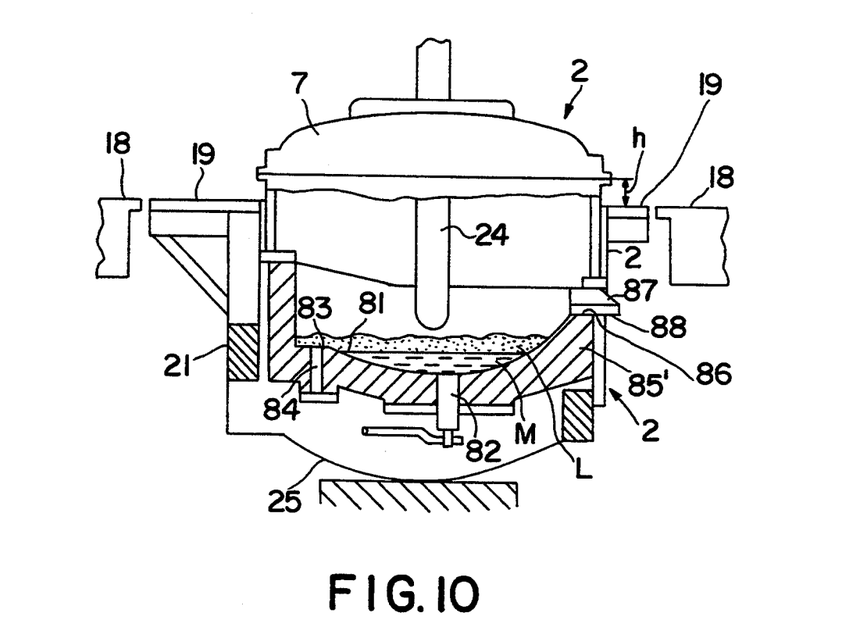
FIG. 10 shows an improved electric furnace on an enlarged scale.

To enhance the installation heating efficiency and provide even greater fume and dust confinement above floor 18, it is of interest, as shown in FIGS. 9 and 10, to substantially raise the height of working floor 18 to the level of the top edge 22 of vessel 20.

First, a larger height H is thus available on the lower floor which facilitates the installation of combustion chamber 30 and the different gas circuits beneath the floor.

In addition, as shown in FIG. 9, raising circulation floor 18 makes it possible to place the entire electrical current generating installation 16 underneath the floor and to protect all the electrical installations from steel projections and other pollutants. Floor 18 is thus completely free of obstructions, facilitating the movement of both personnel and maintenance material around the furnace, and providing greater safety.

In the past, it was considered preferable to place the connection terminals above the level of the vessel in order to keep the cable loops as short as possible, the loops beings required to allow vertical movement of the electrodes, and consequently to keep the cable runs between the electrodes and transformer as short as possible.

However, such an extension of the cables only presents drawbacks in the case of alternating current, and hence, when the furnace is supplied by direct current, the current source 35 can be located below the level of floor 18, as shown in FIG. 9.

Raising circulation floor 18 also causes the furnace to be modified in a way that can improve heat efficiency and reduces pollution.

The hearth of the furnace, generally in the shape of a dish on which the molten metal bath forms covered with slag, has an ovoid-shaped horizontal section with a steel pouring lip above the level of the dish, forming a retaining threshold for the metal.

As already described, furnace 2 is mounted in a chassis 21 that rests on the solid foundation block using interposed rounded bearing blocks 25 on which furnace 2 can roll by rocking forward in order to pour the molten steel over the threshold and into a ladle placed on the lower level, i.e., on the floor of building 1.

On the back part of the vessel on the side opposite the pouring lip, the furnace side wall normally comprises a second opening, known as a deslagging opening, through which the slag covering the molten metal bath can be periodically poured off. For this purpose, the lower part of the deslagging opening also forms a threshold arranged sometimes slightly above the level of steel pouring opening. This allows the slag to be poured off by rocking the furnace backwards, the angle of inclination being adjusted to allow the slag to flow into a ladle placed underneath the furnace while at the same time keeping the molten metal in the dish.

The deslagging opening is therefore above the level of the circulation floor allowing an operator to look into the vessel and check, for example, on the condition of the charge and walls, identify damage to refractory work and possible scrap deposits and, when the furnace is shut down, monitor repair work, particularly if this is performed by robots. To this end, the deslagging opening opens largely into the side wall of the vessel and is fitted with a movable gate. In addition to further drawbacks, this results in leaks which reduce heat efficiency, and also fume emissions whenever the deslagging opening is opened.

Raising the level of floor 18 overcomes these drawbacks and allows modification of the furnace in the way shown in the large scale diagram in FIG. 10.

In the conventional way, the furnace comprises a vessel 2' with a delimiting side wall 20, closed by a roof 23 in which a consumable electrode 24 penetrates downward.

The bottom of the vessel forms a hearth 8 in the form of a dish 81 that contains a conducting device forming a hearth electrode 82 which is in contact with the scrap charge placed on the hearth at the start of the operation.

Electric arcs are thus created between consumable electrode 24 and the scrap which cause the metal to melt, the molten metal forming a metallic bath M recovered by a layer of slag L in the dish.

At the end of the operation, electrode 24 is raised and furnace 1 rocked forward, i.e., towards the left in FIG. 10. Molten steel 36 flows over the upper edge of dish 81 which forms a retaining threshold 83.

As mentioned earlier hereinafter the front threshold 83 normally ends in an opening made in the side wall of the vessel fitted with a pouring lip.

However, in the example shown, the furnace vessel 2 is not fitted with a steel pouring lip, hearth 8 being raised around its edges by a substantially vertical refractory wall 85 that forms the base of side wall 20 of vessel 2'. Threshold 83 is drilled with a substantially vertical pouring opening 84 which passes through the hearth and is closed in a movable way by a known means such as a nozzle.

In this way, when the furnace is tilted forward, molten metal M passes above the pouring opening 84 and, when the nozzle is opened, flows out into a pouring ladle placed at the lower level i.e., on the floor of building 1.

When furnace 1 is tilted backward, the slag L and then the metal bath M flow over the top of the opposite edge of dish 81 which is extended upward by raised edge 85' up to rear threshold 86. The slag L floating on top of metal M overflows first, and is evacuated through opening 87 made in the refractory wall and possibly extended by a pouring lip, from whence the slag can be poured into a pouring ladle placed for this purpose at the lower level.

As shown in FIGS. 9 and 10, circulation floor 18 and auxiliary floor 19 are raised much higher than the level of deslagging threshold 86 so that side wall 20 of vessel 2 only exceeds the level of floors 18 and 19 by a small height h, required simply as a safety measure and which is only a few tens of centimeters and at any rate much less than the height of a mail.

In this way, when roof 23 is open, an operator can walk freely around the furnace and have a view from above enabling him to observe closely the inside of vessel 2. A guard rail can, of course, be fitted to floors 18 or 19.

As a result, the size of the deslagging opening 87 can be significantly reduced and only needs to be big enough to satisfactorily evacuate the slag L, therefore making for good continuity in side wall 21.

Such arrangements confer important advantages.

First, the fumes emitted when the molten metal M or slag are poured are confined below floor 18 and can easily be drawn into the dedusting systems.

In addition, the smaller size of the deslagging opening 87 reduces the quantity of incoming air and makes it easier, if necessary, to effectively close this opening, something that was difficult to achieve previously with a larger opening. It is therefore easier to achieve a pressure balance to stop incoming air, and consequently to improve the energy balance of the furnace.

The height of base 3 is reduced when floor 18 is raised.

In the examples shown in the drawings, a single preheating chamber 4 is used that is fixed permanently to arm 51 and loaded in the preheating position with cold scrap before the roof is closed.

However since roof 7 is off the chamber and carried by the transporting device 5, use can also be made of several specially arranged movable chambers loaded in advance with cold scrap and moved in sequence to the preheating position on the transporting device 5.

Moreover, the hot gases in chamber 4 can circulate from top to bottom, as shown in FIGS. 1 to 8, or from bottom to top, as shown in FIG. 9.

The gas and fume circulation circuits can generally be placed in the most suitable way, according to the arrangement of the different devices, to reduce the length of the ducts, simplify their layout, avoid the emission of fumes, facilitate the movement of chamber 4, etc.

For example, duct 31 could be arranged to lead directly into base 34 through a hole made in floor 18.

We claim:

1. An installation for producing metal by melting a charge of iron material, said installation comprising:
   (a) at least one electric furnace (2) constituted by a melting vessel (2') closed by a removable roof (23) and at least one electrode (24) connected to a current source (16) and penetrating vertically into said vessel through said roof (23);
   (b) means (12, 14) for supplying individual loads of scrap emptied in sequence into said furnace;
   (c) a preheating chamber (4) delimited by a side wall having an upper open end (41) and a lower open end (42), and containing a loading container (40) fitted with an opening bottom (45), said chamber being associated, at least in a preheating position (B') with moveable means (7, 8) for sealing said upper and lower open ends, and with movable means (47, 73) selectively connecting said chamber (4), on two levels offset in height, to one inlet duct (31) and one outlet duct (32) of a hot gas flow circulation circuit (35), said gas flow circulation circuit being used to preheat a charge contained in said loading container (40);

(d) a device (5) for transporting said chamber (4) with said loading container (40) between said preheating position (B') and a loading position (C') directly above said melting vessel (2') where the charge is emptied out by opening said bottom (45);

(e) wherein said side wall of said preheating chamber (4) comprises a lower portion forming a skirt (43) with said lower open end (42) forming a wide downwardly-directed opening, and said chamber (4) is combined, in said preheating position, with movable devices (54) for sealably engaging said lower end (42) with a stationary base (3) shaped to match said lower end (42), whereby said lower end (42) is sealed in said preheating position (B').

2. An installation as claimed in claim 1, wherein said base (3) is arranged on a circulation floor (18) placed at a level of an upper portion of said vessel (2') of said furnace (2).

3. An installation according to claim 2, wherein a side wall of said skirt (43) is fitted with a pipe (47) associated with a movable means (38) for connecting to a branch (31, 32) of said hot gas flow circulation circuit.

4. An installation according to claims 2, wherein one of the ducts (31, 32) of the gas flow circulation circuit opens inside said stationary base (3) through a hole in said floor (18).

5. An installation according to claim 1, wherein said preheating chamber (4) is mounted for movement on said transport device (5).

6. An installation according to claim 1, wherein said preheating chamber (4) is fixed in a permanent manner on said transport device (5).

7. An installation as claimed in claims 1 or 2, wherein said preheating chamber (4) is carried by said device (5) for transporting said chamber using lifting means (54) that raises and lowers said chamber (4) between an upper level for transporting said chamber (4) between said preheating position (B') and said unloading position (C'), and a lower level at which said a lower end (42) of said skirt (43) sealably engages with said base (3).

8. An installation as claimed in claim 7, wherein said lower end (42) of said skirt (43) has a shape substantially matching a shape of an upper edge (22) of the vessel of said furnace (2), such that, in the loading position (C'), said skirt (43) forms a hood for upwardly directing fumes from said furnace (2) into said chamber (4) and thus constitutes an evacuation chimney for said fumes.

9. An installation as claimed in claim 8, wherein the skirt (43) of said preheating chamber (4) is arranged to guide a downward descent of the scrap charged into said vessel (2') of said furnace (2).

10. An installation as claimed in claim 8, wherein, once said preheating chamber (4) has been moved and positioned above said vessel (2'), said lifting means (54) lower said chamber (4) in such a way that said lower end (42) of said skirt (43) stops substantially at the level of said upper edge (22) of said vessel (2').

11. An installation according to claim 1 or 2, wherein said opening bottom (45) of said loading container (40) comprises raisable shells and said skirt (43) raises up above a level of said opening bottom (45) so that it surrounds said side wall (4) at a predetermined distance from said side wall to form a closed annular space at the top into which the shells rise when said furnace is opened.

12. An installation according to claim 1 or 2, comprising a roof (7) for closing said upper end (41) of said preheating chamber (4), said roof (7) being mounted on a support (71) that offers a small range of vertical movement for setting down and raising said roof from said upper end (41) of said chamber (4), and a range of horizontal movement allowing said roof (7) to be swung away from said container (4), said roof (7) being raised and swung away at least for the introduction of a cold charge.

13. An installation according to claim 12, wherein said roof (7) is fitted with a pipe (71) associated with a moveable means (73) of connecting to a duct (31, 32) of said hot gas flow circulation circuit.

14. An installation according to claim 1 or 2, wherein said device (5) for transporting said preheating chamber (4) comprises at least one arm (51) adapted to swing about a vertical axis (50) extending through a stationary base (3) located between said preheating zone (B) and a metal-making zone (C), said arm extending out to a free end fitted with means (53) for supporting said chamber (4), and a means of controlling the rotation of said arm (51) about its axis in order to move said chamber (4) along a circular arc between said preheating portion (B') and said loading position (C') at which said scrap is emptied into said vessel of said furnace (2).

15. An installation as claimed in claim 14, wherein said transport device (5) is fitted with at least one additive charging bin (63) integral in motion with said preheating chamber (4).

16. An installation as claimed in claim 15, wherein said bin (63) is arranged on said transport device (5) in such a way that it passes above said vessel (2) before or after said preheating chamber reaches an unloading position, in an intermediary additive unloading position.

17. An installation according to claims 1 or 2, wherein said installation is placed in a building comprising two parallel, adjacent halls, a first of said halls being a preparation hall containing reception and preheating zones, and a second of said halls being a metal-making hall containing said furnace, said transporting device being placed at a meeting point of said two halls to carry said loading chamber from one hall to the other.

18. An installation according to claim 1 or 2, wherein metal is produced by melting a charge on a hearth (8) constituting the bottom of said vessel (2') of a furnace (2) that forms a metal bath covered by slag, said vessel (2') being fitted with an opening (24) for pouring the molten metal and at least one opening (87) for dislodging and evacuating the slag, the entire installation being placed in a building (1) comprising a circulation floor (18) around the furnace (2) for personnel and equipment,  wherein a section of said opening (87) is sufficient to allow passage of said slag, the circulation floor (18) being above said opening (87) at a level such that most of a side wall (20) of said vessel (2) is below said floor (18), and the upper edge (22) of said vessel (2') protruding above said floor (18) only by a predetermined distance (h), thereby allowing the inside of said vessel (2) to be directly inspected from said floor (18) once said vessel roof (23) has been removed.

19. An installation according to claim 1 or 2, wherein said hearth (8) is raised around its edges by a substantially vertical wall (85) made of refractory material that forms the base of the side wall (20) of said vessel (2') and is fitted at a level of metal overflow threshold (83) with a movable pouring opening (84).

20. An installation according to claim 1 or 2, wherein said current source (16) is placed in its entirety beneath said circulation floor (18).

* * * * *